(12) United States Patent
Kalish

(10) Patent No.: US 12,461,718 B2
(45) Date of Patent: Nov. 4, 2025

(54) SYSTEM AND METHOD OF APPLICATION IMPLEMENTED AS VIDEO

(71) Applicant: Idomoo LTD, Raanana (IL)

(72) Inventor: Danny Kalish, Raanana (IL)

(73) Assignee: IDOMOO LTD, Raanana (IL)

( * ) Notice: Subject to any disclaimer, the term of this patent is extended or adjusted under 35 U.S.C. 154(b) by 256 days.

(21) Appl. No.: 18/184,858

(22) Filed: Mar. 16, 2023

(65) Prior Publication Data
US 2023/0297344 A1 Sep. 21, 2023

Related U.S. Application Data

(60) Provisional application No. 63/320,412, filed on Mar. 16, 2022.

(51) Int. Cl.
G06F 3/0481 (2022.01)
G06F 8/34 (2018.01)

(52) U.S. Cl.
CPC .............. *G06F 8/34* (2013.01); *G06F 3/0481* (2013.01)

(58) Field of Classification Search
CPC . G06F 8/34; G06F 8/33; G06F 3/0481; G06F 3/0482
See application file for complete search history.

(56) References Cited

U.S. PATENT DOCUMENTS

| | | | |
|---|---|---|---|
| 11,882,169 B1* | 1/2024 | Poghosyan | H04L 65/765 |
| 2022/0328071 A1* | 10/2022 | Du | H04N 21/23424 |
| 2024/0152306 A1* | 5/2024 | Basehore | G06T 7/70 |

OTHER PUBLICATIONS

Justin Mazzola et al., Interactive Streaming of Structured Data, Mar. 1, 2010, IEEE International Conference on Pervasive Computing and Communications, pp. 11-19 (Year: 2010).*

Yunyoung Nam et al., An Interactive IPTV System With Community Participation in Cloud Computing Environments, Mar. 1, 2014, IEEE Systems Journal, vol. 8, No. 1, pp. 174-183 (Year: 2014).*

* cited by examiner

*Primary Examiner* — Tam T Tran
(74) *Attorney, Agent, or Firm* — FISHERBROYLES, LLP; Roger L. Browdy; James E. Mrose

(57) ABSTRACT

The present invention provides a video player application platformed functioning as application implemented as interactive video, said platform comprised of:

Builder module for generating video segments frames, each representing an application screen at each operation state the application which reflects all possible activation screen results or functionality of the application, wherein the generated video frame may include static parts objects or dynamic objected which are determined, generate or selected when the video is played at real time, entering text/image video by the user wherein the generated frames include position of all button off the application;

Interaction module configured to receive input and apply action or gesture by the user the application screen while the video is streaming;

application management module for applying all actions in the application or outside the application.

16 Claims, 6 Drawing Sheets video builder
100 generating interactive video based on screen/video frames including position of all button within the video, predefined position of each button, each button has functionality, the button can be any video element :text, image, video 110 generating screen/video segments frames representing different application screens which represent the application at different operation states, the application screens reflects all possible activation or functionality of the application. The generated video frame may include static parts objects or dynamic objected which are determined, generate or selected when the video is played at real time, such entering text /image video by the user, user drawing action, 120

Defining interactions based on gestures, speech, voice recognition 130

Defining flow of actions applied by the application, is association with user input or behaviour, for action associated screen video frames 140

Figure 3 application management module
25-

Receiving input data of user behaviour while watching the video 260

Determining all actions to applied which are part the application inside functionality or outside the application based on user input data and behavior, wherein the action include : go to, invoke API, interaction with web page, retrieve or saved data, transmit data, change /analyses data , cookies, interaction with data source (internal sensors,); 270

Determining navigation paths between screens and changes within the screen in all video parts and all based on user interaction and behavior with video enabling user preforming actions; 230

Figure 5 generation module 300A generating/changing/selecting the video frames/segments using the generated interactive module based on determined actions 310

Updating the interactive video frames/parts and/or changing video object properties based on determined navigation path between screens and changes in the screen appearance, 320

Streaming /generating/changing/selecting the video frames/parts based determined in the application or outside the application, action include : go to, invoke API, interaction with web page, retrieve or saved data , transmit data , change /analyses data , read/save cookies, interaction with data source (internal sensors, 330

Figure 6

SYSTEM AND METHOD OF APPLICATION IMPLEMENTED AS VIDEO

BACKGROUND

Technical Field

The present invention relates generally to generation of application implemented as video.

SUMMARY

The present invention provides a video player application platformed functioning as application implemented as interactive video, said platform comprised of:
  Builder module configured for
  generating screen/video segments frames each representing an application screen which represent one screen of the application at each operation state the application which reflects all possible activation screen results or functionality of the application. Wherein the generated video frame may include static parts objects or dynamic objected which are determined, generate or selected when the video is played at real time, such entering text/image video by the user, user drawing action wherein the generated frames include position of all button off the application predefined position of each button in the video where each button has functionality with the application, the button can be any video element: text, image, video, and Defining interactions based on gestures, speech, voice recognition.
  Interaction module configured to receive input and apply action or gesture by the user, where the application screen while the video is streaming based on business logic, personalized/customized context bases, enabling navigation between screens and changes in the screen is all video and all interaction are video preforming actions;
application management module for applying all actions, in the application or outside the application, wherein the action include: go to, invoke API, interaction with web page, retrieve or saved data, transmit data, change/analyses data, cookies, interaction with data source (internal sensors,)

The present invention provides a video streaming platform, implemented by one or more processors operatively coupled to a non-transitory computer readable storage device, which comprise the module of:
  builder module for generating an interactive video comprised of video segments and frames, where the segments or frames represent different application screens at different operation states, said application screens reflecting all possible activation screen results or functionality of the application;
  an application functioning as interactive video application, comprised of:
    interaction module configured to receive input, action or gesture applied by the user in relation to application screen while the video is streaming;
    application management module for determining all action to be applied, which are part the application inside functionality, based on user received input;
    video generation module for real time generating/changing/selecting the video frames/parts using the generated interactive module based on determined actions.

According to some embodiments of the present invention the generated video frame include static parts objects or dynamic objected which are determined, generate or selected when the video is played at real time including at least one of entering text/image video by the user, user drawing action.

According to some embodiments of the present invention the generating screen/video frames including position of all button within the video, predefined position of each button, each button ha functionality, the button can be any video element: text, image, video, defining interactions based on gestures, speech, voice recognition.

The video player application of claim 1 wherein identifying user behaviour while watching the video including at least one of: user interaction with the video, user entered data, user facial expression micro expression, behaviour hints, in relation to currently displayed video content/content characteristics at frame level, per object, any parameter controlled at the video granular modification.

According to some embodiments of the present invention the received input of user behaviour while watching the video including at least one of: user interaction with the video, selecting/pressing buttons, user entered data, user facial expression micro expression, behaviour hints wherein the behaviour is associated with the currently displayed video content/content characteristics at frame level, per object, any parameter controlled at the video granular modification.

According to some embodiments of the present invention the video generation include navigation between screens and changes in the screen appearance, changing video object properties.

According to some embodiments of the present invention the interaction of the user with the video can be implemented in real time with virtual reality.

According to some embodiments of the present invention the application management module applying actions outside the application wherein the action include: go to, invoke API, interaction with web page, retrieve or saved data, transmit data, change/analyses data, cookies, interaction with data source or internal sensors.

The present invention provides a method for managing video player application functioning as interactive video application, implemented by one or more processors operatively coupled to a non-transitory computer readable storage device, said method comprising the steps of:
  generating video segments frames, each representing different application screens at different operation states reflects all possible activation screen results or functionality of the application;
  receiving input, action or gesture applied by the user in relation to application screen while the video is streaming;
  for determining all action to be applied, which are part the application inside functionality, based on user received input
  Streaming/generating/changing/selecting the video frames/parts based on determined actions.

According to some embodiments of the present invention the generated video frame include static parts objects or dynamic objected which are determined, generate or selected when the video is played at real time including at least one of entering text/image video by the user, user drawing action.

According to some embodiments of the present invention the generating screen/video frames including position of all button within the video, predefined position of each button, each button ha functionality, the button can be any video element: text, image, video, defining interactions based on gestures, speech, voice recognition.

According to some embodiments of the present invention the identifying user behaviour while watching the video including at least one of: user interaction with the video, user entered data, user facial expression micro expression, behaviour hints, in relation to currently displayed video content/content characteristics at frame level, per object, any parameter controlled at the video granular modification.

According to some embodiments of the present invention the user behaviour while watching the video including at least one of: user interaction with the video, selecting/pressing buttons, user entered data, user facial expression micro expression, behaviour hints wherein the behaviour is associated with the currently displayed video content or characteristics at frame level, per object, any parameter controlled at the video granular modification.

According to some embodiments of the present invention the video generation include navigation between screens and changes in the screen appearance, changing video object properties.

According to some embodiments of the present invention the interaction of the user with the video can be implemented in real time with virtual reality.

According to some embodiments of the present invention the application management module applying actions outside the application wherein the action include: go to, invoke API, interaction with web page, retrieve or saved data, transmit data, change/analyses data, cookies, interaction with data source or internal sensors;

BRIEF DESCRIPTION OF THE SCHEMATICS

The present invention will be more readily understood from the detailed description of embodiments thereof made in conjunction with the accompanying drawings of which:

FIG. 3 is a flowchart depicting the video builder tool, according to some embodiments of the invention.

FIG. 5 is a flowchart depicting the application management module 250, according to some embodiments of the invention FIG. 6 is a flowchart depicting the generation module 300, according to some embodiments of the invention.

DETAILED DESCRIPTION OF THE VARIOUS MODULES

Figure 1:
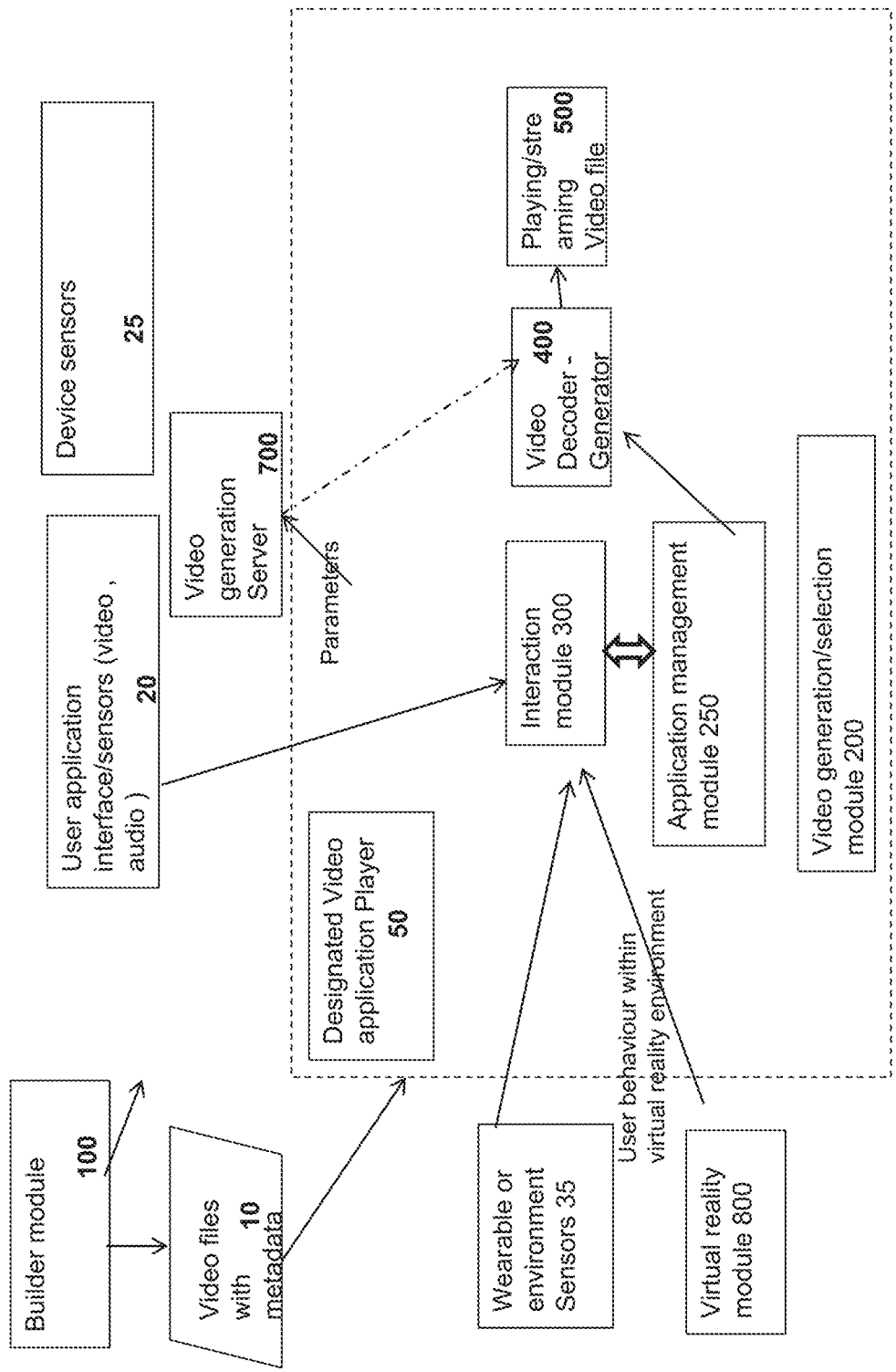
FIG. 1 is a block diagram, depicting the components and the environment of the video player system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a list of definitions of the terms used throughout this application, adjoined by their properties and examples.

Definition

Video instruction metadata contains data that are essential for drawing blueprints for the scene: including at least one of the following: A composition of what elements to draw and where/when/how they should be drawn, transformed, animated, etc.).

The metadata may include text, images, and video, how they all move and appear throughout time together and with respect to each other.

The metadata include data of the 'scene graph' of the scene (i.e., how the scene is to be drawn from all of its elements, and throughout time).

FIG. 1 is a block diagram, depicting the components and the environment of the video player system, according to some embodiments of the invention.

The systems comprise a video application player 10 which enable to run an application which is implemented as video on user smart phone device, the application player 50 is controlled by user application interface 20 and device sensors 25, optionally the player receive data from Virtual reality module 800 and or Wearable or environment Sensors 35. The video application file is generated using a video app builder 100 which is configured to enable the user to design the screens of the application, the interface and it's functionality which are expressed as video segments which The player comprise an interface module 20 enabling to receive all input data of user interface and different sensors, analyze the to identify the required action or functionality of the application and instruction to the video server 700 for generating required frames, or select the next video frames or segments which provide the desired screen content reflecting the required action or functionality.

Figure 2:
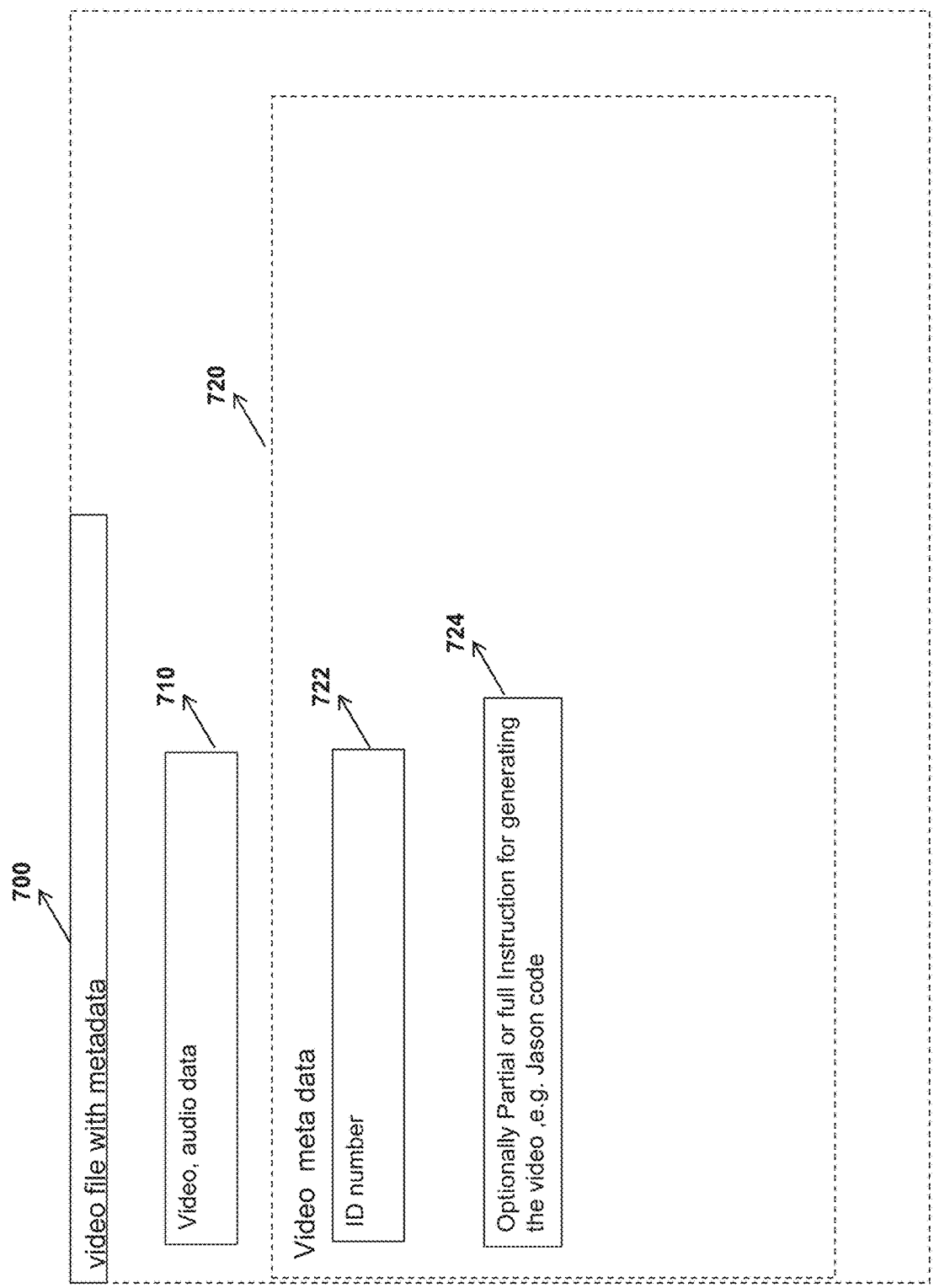
FIG. 2 is a block diagram depicting the video file format information structure, according to one embodiment of the invention.

FIG. 2 is a block diagram depicting the video file format information structure, according to one embodiment of the invention. The video meta file include audio data 710, Id number 772 and Optionally Partial or full Instruction for generating the video, e.g. Jason code 724.

FIG. 3 is a flowchart depicting the video builder tool, according to some embodiments of the invention.

Figure 4:
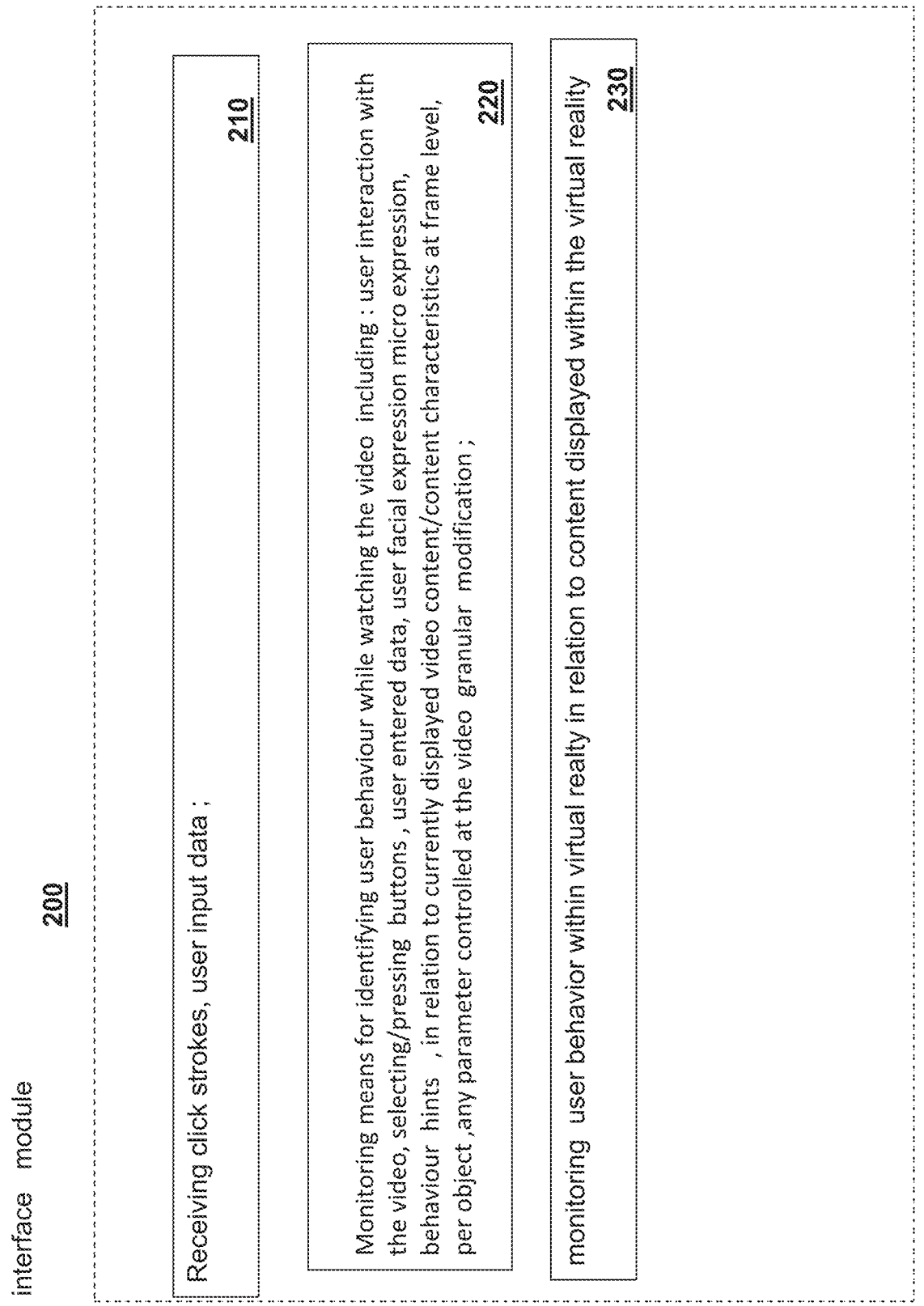
FIG. 4 is a flowchart depicting the user instruction module 200, according to some embodiments of the invention.

The builder module is configured to apply on of the following steps:
defining application functionality and activation buttons;
generating interactive video which corresponds application functionality, the interactive video comprised of screen/video frames including position of all application button within the video, each button has functionality in the application, the button can be any video element: text, image, video (110);

The generating of video segments frames represent different screens of the application at different operation state of the application which reflects all possible activation screen results or functionality of the application. The generated video frame may include static parts objects or dynamic objected which are determined, generate or selected when the video is played at real time, such entering text/image video by the user, user drawing action;

Defining interactions based on gestures, speech, voice recognition (130);

Defining flow of actions applied by the application, is association with user input or behaviour, for each action defined steps/operation associated screen video frames (140);

FIG. 4 is a flowchart depicting the user interface module 200, according to some embodiments of the invention.

The interface module is configured to apply on of the following steps:

Monitoring means for identifying user behaviour while watching the video including: user interaction with the video, user entered data, user facial expression micro expression, behaviour hints, in relation to currently displayed video content/content characteristics at frame level, per object, any parameter controlled at the video granular modification (210);

Monitoring means for identifying user behaviour while watching the video including: user interaction with the video, selecting/pressing buttons, user entered data, user facial expression micro expression, behaviour hints, in relation to currently displayed video content/content characteristics at frame level, per object, any parameter controlled at the video granular modification (220);

monitoring user behavior within virtual reality in relation to content displayed within the virtual reality (230);

FIG. 5 is a flowchart depicting the application management module 250, according to some embodiments of the invention.

The application management module 250 is configured to apply on of the following steps:

Receiving input data of user behaviour while watching the video (260)

Determining all actions to applied which are part the application inside functionality or outside the application, wherein the action include: go to, invoke API, interaction with web page, retrieve or saved data, transmit data, change/analyses data, cookies, interaction with data source (internal sensors); 270

Determining navigation paths between screens and changes within the screen in all video parts and all based on user interaction and behavior with video enabling user preforming actions 280;

FIG. 6 is a flowchart depicting the generation module 300, according to some embodiments of the invention.

The generation module 30 is configured to apply on of the following steps:

Streaming/generating/changing/selecting the video frames/parts based on determined actions 310;

Streaming/generating/changing/selecting the video frames/parts and/or changing video object properties based on determined navigation path between screens and changes in the screen appearance 320;

Streaming/generating/changing/selecting the video frames/parts based determined in the application or outside the application, action include: go to, invoke API, interaction with web page, retrieve or saved data, transmit data, change/analyses data, read/save cookies, interaction with data source (internal sensors); 330

Streaming/generating/changing the video module configured for real time generating screen/video segments frames each representing an application screen which represent one screen of the application at each operation state the application which reflects all possible activation screen results or functionality of the application.

generating screen/video frames including position of all button within the video, predefined position of each button, each button ha functionality, the button can be any video element: text, image, video, defining interactions based on gestures, speech, voice recognition Streaming/generating/changing the video based on selecting video parts based on user interaction According to some embodiments of the present invention the application is running over the video platform player enabling to edit an/or manage the application by displaying screen using video component.

According to some embodiments of the present invention the interaction of the user with the video can be implemented in real time with virtual reality (metaverse)

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitably operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g., digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order, program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order, electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order, a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A video streaming platform, implemented by one or more processors operatively coupled to a non-transitory computer readable storage device, which comprises:
    builder module configured for generating an interactive video comprised of video segments and frames, where the video segments or frames represent different application screens at different operation states, said application screens reflecting all possible activation screen results or functionality of the application;
    an application functioning as interactive video application, comprised of:
        interaction module configured to receive input, action or gesture applied by the user in relation to application screen while the video is streaming;
        application management module configured for determining all action to be applied based on business rules, which are part the application inside functionality, based on user received input;
        video generation module configured for real time generating/changing/selecting the video frames/parts using the generated interactive module based on determined actions;
    wherein the application management module applies actions outside the application wherein the actions include: go to, invoke API, interaction with web page, retrieve or saved data, transmit data, change/analyze data, cookies, interaction with data source or internal sensors;
    wherein the application management module defines flow of actions applied by the application, in association with user input or behavior, for each action defined steps/operation associated screen video frames.

2. The video player application streaming platform of claim 1, wherein generated video frame include static parts objects or dynamic objected which are determined, generate or selected when the video is played at real time including at least one of entering text/image video by the user, user drawing action.

3. The video streaming platform of claim 1, wherein generating screen/video frames including position of all button within the video, predefined position of each button, each button ha functionality, the button can be any video element: text, image, video, defining interactions based on gestures, speech, voice recognition.

4. The video streaming platform of claim 1 wherein identifying user behaviour while watching the video including at least one of: user interaction with the video, user entered data, user facial expression micro expression, behaviour hints, in relation to currently displayed video content/content characteristics at frame level, per object, any parameter controlled at the video granular modification.

5. The video streaming platform of claim 1 wherein the receives input of user behaviour while watching the video including at least one of: user interaction with the video, selecting/pressing buttons, user entered data, user facial expression micro expression, behaviour hints wherein the behaviour is associated with the currently displayed video content/content characteristics at frame level, per object, any parameter controlled at the video granular modification.

6. The video streaming platform of claim 1 wherein the video generation include-includes navigation between screens and changes in the screen appearance, changing video object properties.

7. The video streaming platform of claim 1 wherein the interaction of the user with the video can be implemented in real time with virtual reality.

8. The video streaming platform of claim 1 wherein the application management module applying actions outside the application wherein the action include: go to, invoke API, interaction with web page, retrieve or saved data, transmit data, change/analyses data, cookies, interaction with data source or internal sensors.

9. A method for managing video functioning as interactive video application, implemented by one or more processors operatively coupled to a non-transitory computer readable storage device, said method comprising the steps of:
- generating video segments frames, each representing different application screens at different operation states reflects all possible activation screen results or functionality of the application;
- receiving input, action or gesture applied by the user in relation to application screen while the video is streaming;
- for determining all action to be applied based on business rules, which are part the application inside functionality, based on user received input;
- streaming/generating/changing/selecting the video frames/parts based on determined actions;
- applying actions outside the application wherein the actions include: go to, invoke API, interaction with web page, retrieve or saved data, transmit data, change/analyze data, cookies, interaction with data source or internal sensors;
- defining flow of actions applied by the application, in association with user input or behavior, for each action defined steps/operation associated screen video frames.

10. The method of claim 9, wherein generated video frame includes static parts objects or dynamic objects which are determined, generate or selected when the video is played at real time including at least one of entering text/image video by the user, user drawing action.

11. The method of claim 9, wherein generating screen/video frames including position of all buttons within the video, predefined position of each button, each button ha functionality, the button can be any video element: text, image, video, defining interactions based on gestures, speech, voice recognition.

12. The method of claim 9 wherein identifying user behaviour while watching the video including at least one of: user interaction with the video, user entered data, user facial expression micro expression, behaviour hints, in relation to currently displayed video content/content characteristics at frame level, per object, any parameter controlled at the video granular modification.

13. The method of claim 9 wherein receive input of user behaviour while watching the video including at least one of: user interaction with the video, selecting/pressing buttons, user entered data, user facial expression micro expression, behaviour hints wherein the behaviour is associated with the currently displayed video content or characteristics at frame level, per object, any parameter controlled at the video granular modification.

14. The method of claim 9 wherein the video generation includes navigation between screens and changes in the screen appearance, changing video object properties.

15. The method of claim 9 wherein the interaction of the user with the video can be implemented in real time with virtual reality.

16. The method of claim 9 wherein the application management module applying actions outside the application wherein the action include: go to, invoke API, interaction with web page, retrieve or saved data, transmit data, change/analyses data, cookies, interaction with data source or internal sensors.

* * * * *